US012129876B2

(12) United States Patent
Tao et al.

(10) Patent No.: US 12,129,876 B2
(45) Date of Patent: Oct. 29, 2024

(54) BISTABLE ELASTOMERIC ACTUATOR

(71) Applicants: Weijia Tao, Mesa, AZ (US); Wenlong Zhang, Chandler, AZ (US); Zhi Qiao, Tempe, AZ (US)

(72) Inventors: Weijia Tao, Mesa, AZ (US); Wenlong Zhang, Chandler, AZ (US); Zhi Qiao, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 18/193,249

(22) Filed: Mar. 30, 2023

(65) Prior Publication Data

US 2023/0313819 A1 Oct. 5, 2023

Related U.S. Application Data

(60) Provisional application No. 63/327,691, filed on Apr. 5, 2022.

(51) Int. Cl.
*F15B 15/10* (2006.01)
*F15B 15/14* (2006.01)

(52) U.S. Cl.
CPC .......... *F15B 15/10* (2013.01); *F15B 15/1423* (2013.01); *F15B 2215/305* (2013.01)

(58) Field of Classification Search
CPC .................................... F15B 15/10; F16J 3/04
See application file for complete search history.

(56) References Cited

U.S. PATENT DOCUMENTS

| | | | | | |
|---|---|---|---|---|---|
| 2,150,904 | A | * | 3/1939 | Becker | G01L 7/08 92/48 |
| 3,319,532 | A | * | 5/1967 | Pridham, Jr. | F15B 15/10 92/34 |
| 3,645,173 | A | * | 2/1972 | Yarlott | F15B 15/103 92/92 |
| 4,120,635 | A | * | 10/1978 | Langecker | B29C 49/48 425/522 |
| 4,464,980 | A | * | 8/1984 | Yoshida | B29C 53/30 264/506 |
| 4,629,641 | A | * | 12/1986 | Paullin | F16J 3/042 428/184 |
| 4,800,723 | A | * | 1/1989 | Clot | B25J 3/04 92/39 |
| 5,697,285 | A | * | 12/1997 | Nappi | A61B 34/70 92/48 |

(Continued)

OTHER PUBLICATIONS

Tao, W. et al., "Design, Characterization, and Dynamic Modeling of BEAST: a Bistable Elastomeric Actuator for Swift Tasks". 2022. p. 1-6.

(Continued)

*Primary Examiner* — Thomas E Lazo
(74) *Attorney, Agent, or Firm* — Snell & Wilmer L.L.P.

(57) ABSTRACT

Elastomeric actuators and methods of making the same are provided herein. In some examples, an actuator includes a body comprising a plurality of pairs of frustums, wherein the body is configured to receive a fluid to extend the actuator and to remove the fluid to contract the actuator. In some examples, each pair of frustums includes two thin frustum shells sharing a common base circle diameter.

15 Claims, 8 Drawing Sheets

(56) References Cited

U.S. PATENT DOCUMENTS

| | | | | |
|---|---|---|---|---|
| 7,134,648 | B1 * | 11/2006 | Rode | F16F 3/10<br>267/162 |
| 9,624,911 | B1 * | 4/2017 | Griffith | F24S 23/74 |
| 9,765,909 | B2 * | 9/2017 | Ashcroft | B32B 7/12 |
| 10,562,180 | B2 * | 2/2020 | Telleria | F16J 3/04 |
| 2017/0282360 | A1 * | 10/2017 | Telleria | F16J 3/04 |

OTHER PUBLICATIONS

Polygerinos, P. et al., "Soft Robotics: Review of Fluid-Driven Intrinsically Soft Devices; Manufacturing, Sensing, Control, and Applications in Human-Robot Interaction," Advanced Engineering Materials. 2017. vol. 19, No. 12.

Nguyen, P. H. et al., "Fabric soft poly-limbs for physical assistance of daily living tasks," Proc. IEEE Int. Conf. on Robotics and Automation. 2019. pp. 8429-8435.

Nguyen, P. H. et al., "Design and computational modeling of fabric soft pneumatic actuators for wearable assistive devices," Scientific reports. 2020. vol. 10, No. 1, pp. 1-13.

Hao, Y. et al., "Universal soft pneumatic robotic gripper with variable effective length," Proc. Chinese Control Conference, vol. Aug. 2016, pp. 6109-6114.

Lashci, C. et al., "Soft robotics: New perspectives for robot bodyware and control," Frontiers in Bioengineering and Biotechnology. 2014. vol. 2, No. JAN, pp. 1-5.

Topçu, E. E. et al., "Development of electropneumatic fast switching valve and investigation of its characteristics," Mechatronics. 2006. vol. 16, No. 6, pp. 365-378.

Sridar, S. et al., "Towards Untethered Soft Pneumatic Exosuits Using Low-Volume Inflatable Actuator Composites and a Portable Pneumatic Source," IEEE Robotics and Automation Letters. 2020. vol. 5, No. 3, pp. 4062-4069.

Hutmacher, D. et al., "Ultrafast Soft Actuators," ResearchSquare. 2021. pp. 1-16.

Pal, A. et al., "Exploiting Mechanical Instabilities in Soft Robotics: Control, Sensing, and Actuation," Advanced Materials. 2021. vol. 2006939, p. 2006939.

Chi, Y. et al., "Bistable and Multistable Actuators for Soft Robots: Structures, Materials, and Functionalities," Advanced Materials. 2022. vol. 2110384, p. 2110384.

Ha, C. S. et al., "Design, fabrication, and analysis of lattice exhibiting energy absorption via snap-through behavior," Materials and Design. 2018. vol. 141, pp. 426-437.

Gustafson, K. et al., "Model-based design of a multistable origami-enabled crawling robot," Smart Materials and Structures. 2020. vol. 29, No. 1.

Gorissen, B. et al., "Inflatable soft jumper inspired by shell snapping," Science Robotics. 2020. vol. 5, No. 42, pp. 1-8.

Nguyen, A. K. et al., "A Tri-Stable Soft Robotic Finger Capable of Pinch and Wrap Grasps," Proc. IEEE Robotics and Automation. 2020. pp. 9028-9034.

Thuruthel, T. G. et al., "A bistable soft gripper with mechanically embedded sensing and actuation for fast grasping," Proc. IEEE Int. Conf. on Robot and Human Interactive Communication. 2020. pp. 1049-1054.

Tang, Y. et al., "Leveraging elastic instabilities for amplified performance: Spine-inspired high-speed and high-force soft robots," Science advances, vol. 6, No. 19, p. eaaz6912, 2020.

Bende, N. P. et al., "Overcurvature induced multistability of linked conical frusta: How a 'bendy straw' holds its shape," Soft Matter. 2018. vol. 14, No. 42, pp. 8636-8642.

Pan, F. et al., "3D Pixel Mechanical Metamaterials," Advanced Materials. 2019. vol. 31, No. 25, pp. 1-8.

McWilliams, J. et al., "Push-on push-off: A compliant bistable gripper with mechanical sensing and actuation," in Proc. IEEE Int. Conf. on Soft Robotics, 2021, pp. 622-629.

Qiao, Z. et al., "Dynamic modeling and motion control of a soft robotic arm segment," in Proc. American Control Conference, 2019, pp. 5438-5443.

Zhang, B. "Bistable and multi-stable thin-walled structures," Ph.D. dissertation, University of Oxford, 2017.

Tao W. et al., "Bioinspired design and fabrication principles of reliable fluidic soft actuation modules," Proc. IEEE Int. Conf. on Robotics and Biomimetics. 2015. pp. 2169-2174.

* cited by examiner

BISTABLE ELASTOMERIC ACTUATOR

CROSS-REFERENCE TO RELATED APPLICATIONS

This application claims priority to and the benefit of U.S. Provisional Patent Application No. 63/327,691, filed Apr. 5, 2022, entitled "Bistable Elastomeric Actuator." The content of the foregoing application is hereby incorporated by reference (except for any subject matter disclaimers or disavowals, and except to the extent of any conflict with the disclosure of the present application, in which case the disclosure of the present application shall control).

FEDERALLY SPONSORED RESEARCH OR DEVELOPMENT

This invention was made with government support under 1800940 awarded by the National Science Foundation. The government has certain rights in the invention.

TECHNICAL FIELD

The present disclosure relates to inflatable actuators.

BACKGROUND

Among other drawbacks, slow actuation speed of fluid-driven soft actuators reduces their task efficiency and greatly limits their applications. Accordingly, improved actuators remain desirable.

SUMMARY

In various embodiments, an actuator may include a body. The body may include a plurality of pairs of frustums. The body may be configured to receive a fluid to extend the actuator. The body may be configured to remove a fluid to contract the actuator.

In various embodiments, each pair of frustums may include two thin frustum shells. The thin frustum shells may share a common base circle diameter. One of the thin frustum shells may be configured with a large base angle. The other of the thin frustum shells may be configured with a small base angle. The thin frustum shell configured with a large base angle may include a base angle of about 55 degrees. The thin frustum shell configured with a small base angle may include a base angle of about 40 degrees.

In various embodiments, the two thin frustum shells may be coupled by a soft folding hinge. The soft folding hinge may include an elastomer. In various embodiments, a portion of the thin frustum shell configured with a large base angle may be shaved off and replaced by an elastomer. In various embodiments, the body may include an elastomer. The elastomer may include silicone.

In various embodiments, the body may include a support frustum. In various embodiments, each frustum may be threaded with yarn. In various embodiments, the plurality of pairs of frustums may include a thermoplastic polymer. The thermoplastic polymer may include polyethylene terephthalate (PET). In various embodiments, the actuator may include a plate. The plate may include a vent. The vent may be configured to be screw-mounted onto a surface.

In various embodiments, a method for forming actuator may include folding a thermoplastic polymer sheet into a frustum shape. The method may include threading yarn around the thermoplastic polymer sheet. The method may include molding, in a first mold, a plurality of thermoplastic polymer frustums with an elastomer to form a plurality of elastomer frustums with embedded thermoplastic polymer. The method may include molding, in a second mold, the plurality of elastomer frustums to form an actuator shape. The second mold may include a soft thermoplastic polyurethane inner mold. The method may include demolding the actuator. The method may include inserting a thermoplastic polymer support shell into the actuator.

In various embodiments, the thermoplastic polymer may include polyethylene terephthalate (PET). In various embodiments, the plurality of thermoplastic polymer frustums may include at least one thermoplastic polymer frustum with a large base angle and at least one thermoplastic polymer frustum with a small base angle. In various embodiments, the elastomer may include silicone.

In various embodiments, an apparatus may include a plurality of actuators. In various embodiments, each actuator may include a body. The body may include a plurality of pairs of frustums. The body may be configured to receive a fluid to extend the actuator. The body may be configured to remove a fluid to contract the actuator.

The apparatus may include a first surface. The first surface may be operably connected to a first end of each actuator. The apparatus may include a second surface. The second surface may be operable connected to a second end of each actuator.

The contents of this section are intended as a simplified introduction to the disclosure, and are not intended to limit the scope of any claim.

BRIEF DESCRIPTION OF THE DRAWINGS

With reference to the following description and accompanying drawings.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques and components may not be described in detail herein. Furthermore, the connecting lines shown in various figures contained herein are intended to represent exemplary functional relationships and/or physical couplings between various elements. It should be noted that many alternative or additional functional relationships or physical connections may be present in exemplary systems and/or components thereof.

With reference now to FIGS. 1A-3C, in various exemplary embodiments, an actuator enables both fast actuation and mechanical compliance, and integrates silicone and polyethylene terephthalate (PET) components in a "bendy straw" structure. An exemplary actuator may be configured with three states—compressed, natural, and stretched states. Additionally, an exemplary actuator may be considered to operate in at least two operation modes—compressed and stretched modes, and continuous elongation dynamics of various exemplary modes are set forth herein. A set of exemplary design rules and a novel fabrication method are presented to develop various exemplary actuators. Characterization of one exemplary actuator shows a maximum extension ratio, snapping speed, and output force to be 0.58, 1.5 m/s, and 48N, respectively.

In various exemplary embodiments, an actuator comprises a body comprising a plurality of pairs of frustums. The body is configured to receive a fluid to extend the actuator and to remove the fluid to contract the actuator.

In some embodiments, each pair of frustums comprises two thin frustum shells sharing a common base circle diameter; one of the shells is configured with a large base angle and the other of the shells is configured with a small base angle; and/or the two frustum shells are coupled by a soft folding hinge.

In some exemplary embodiments, a method for forming an actuator comprises:

folding a PET sheet into a frustum shape; threading yarn around the PET sheet; molding, in a first mold, a plurality of PET frustums with silicone to form a plurality of silicone frustums with embedded PET; molding, in a second mold with a soft thermoplastic polyurethane inner mold, the plurality of silicone frustums to form an actuator shape; demolding the actuator; and inserting a PET support shell into the actuator.

Figures 1A, 1B, 1C, 1D, 1E:
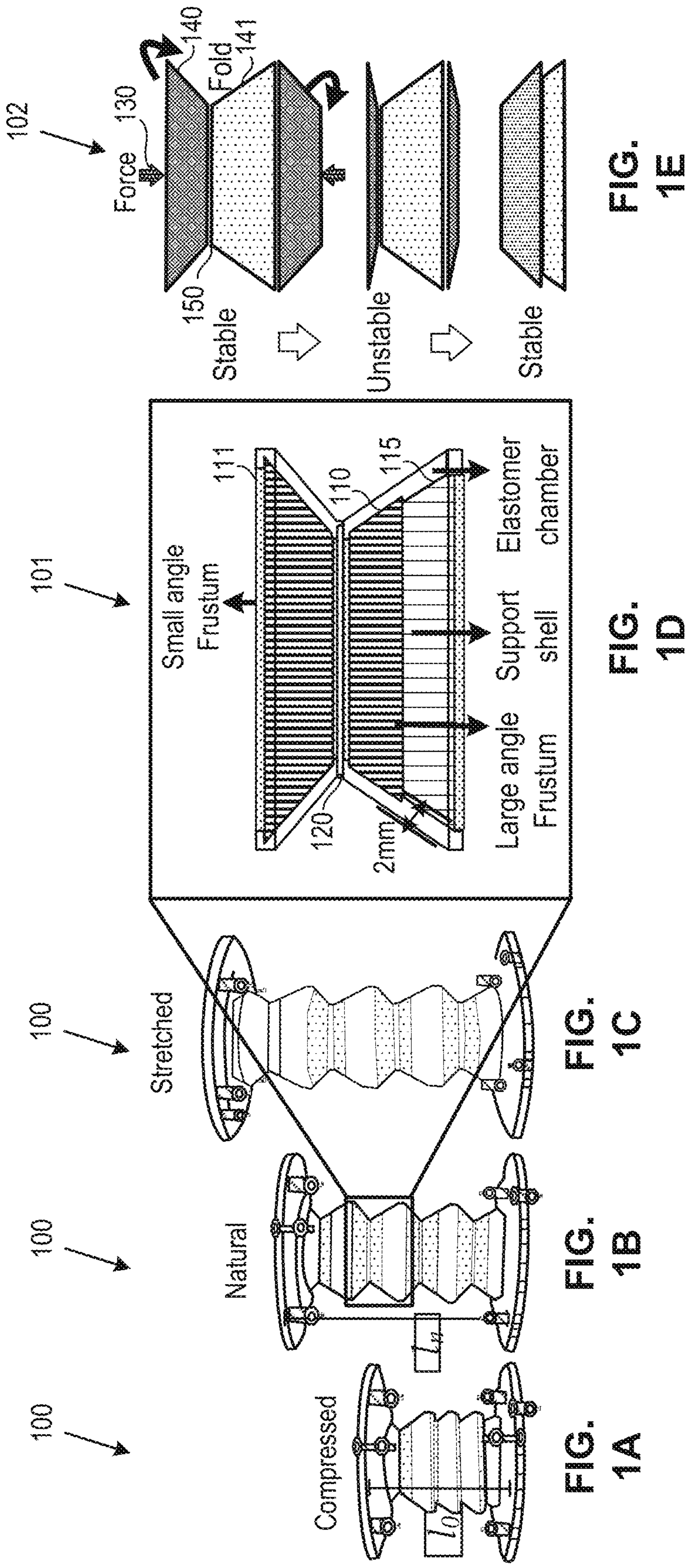
FIGS. 1A, 1B, 1C, 1D, and 1E illustrate an exemplary inflatable actuator and exemplary principles of operation thereof, in accordance with various exemplary embodiments.

With reference now to FIGS. 1A-1E, in various exemplary embodiments, actuator 100 may have three states. As shown in FIG. 1A, actuator 100 may have a compressed state. As shown in FIG. 1B, actuator 100 may have a natural state. As shown in FIG. 1C, actuator 100 may have a stretched state. With the application of triggering pressure, actuator 100 may quickly snap from the compressed state to the stretched state. Actuator 100 may continue extending as the applied pressure increases. When the applied pressure returns to atmospheric pressure, actuator 100 may stay in the natural state. When the applied pressure is negative, actuator 100 may return to the compressed state.

With continued reference to FIGS. 1A-1E, the bistable structure used in actuator 100 may be similar to a flexible straw consisting of multiple pairs of frustums stacked in series. The overall bistable structure has multiple stable equilibria since it can be fully or partially snapped. For example, with reference to FIG. 1D, each pair of frustums may include two thin frustum shells 110, 111, sharing the same base circle diameter: a frustum with a large base angle 110 and a frustum with a small base angle 111. Frustums 110 and 111 may be formed from a polymeric material. Frustums 110 and 111 may be formed from a plastic. Frustums 110 and 111 may be formed from a rigid plastic. Frustums 110 and 111 may be formed from a flexible plastic. In some examples, frustums 110 and 111 may be formed from poly(ethylene terephthalate) (PET). In some examples, frustums 110 and 111 may be formed from any flexible plastic-like material under 3 millimeters in thickness. Frustums 110 and 111 may have a thickness of between about 1 mm and about 10 mm. Frustums 110 and 111 may have a thickness of between about 2 mm and about 9 mm. Frustums 110 and 111 may have a thickness of between about 4 mm and about 7 mm.

Frustums 110 and 111 may have a thickness of between 0.1 and 4 mm. In the preferred embodiment, frustum 110 has a thickness of less than lmm and frustrum 111 has a thickness of less than 3 mm.

A soft folding hinge 120 may connect the frustum shells 110, 111 to one another. Soft folding hinge 120 may be formed from a polymeric material. Soft folding hinge 120 may be formed from an elastomer. For example, soft folding hinge 120 may be formed from ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, or any suitable combination thereof. Soft folding hinge 120 may be formed from a thermoset. For example, soft folding hinge 120 may be formed from polyisoprene, polybutadiene, chloroprene rubber, polychloroprene, neoprene, butyl rubber, a halogenated butyl rubber, styrene-butadiene rubber, nitrile rubber, or any suitable combination thereof. Soft folding hinge 120 may be formed from a thermoplastic elastomer. For example, soft folding hinge 120 may be formed from a styrenic block copolymer, thermoplastic polyolefinelastomers, thermoplastic vulcanizates, thermoplastic polyurethanes, thermoplastic copolyester, thermoplastic polyamides, or any suitable combination thereof. In various embodiments, the soft folding hinge 120 may be formed from any moldable material with a hardness of 00 to 90 ShoreA on the Shore Hardness Scale. In a nonlimiting example, soft folding hinge 120 may be formed from silicone rubber.

Soft folding hinge 120 may be formed from a material that has a high extension ratio. For example, soft folding hinge 120 may be formed from a material that has an extension ratio between about 1 and about 12, more preferably between about 3 and about 10. Soft folding hinge 120 may be formed from a material that can endure high pressure without blasting at relatively thin thickness.

With continued reference to FIGS. 1A-1E, as shown in FIG. 1E, when axial force 130 is applied to a pair of frustums 140, 141 with different base angles, frustum with a small base angle 140 may be triggered before frustum with a large base angle 141. Frustum 140 may thus snap around folding hinge 150. During this process, structure 102 may first turn from one stable state to an unstable state and store energy. Then it may release energy rapidly from the unstable state to another stable state. Frustum 141 may only act as a supporting structure. The force needed for triggering the snapping may be proportional to frustum 140's base angle and Young modulus. Frustum 140 may have a Young's modulus between about 1 MPa and about 50 MPa.

This unique feature enables the fast snap-through discrete elongation/compression behaviors of actuator 102. When an uneven force is applied to frustums 140, 141, frustum 140 may partially fold to frustum 141, leading to a bending motion. The natural state of actuator 102 can be adjusted by stacking the different numbers of pairs of frustums in series. For example, a stack of frustums may contain 2 pairs of frustums, 3 pairs of frustums, 4 pairs of frustums, 5 pairs of frustums, or more.

With continued reference to FIGS. 1A-1E, to perform elongation when pressurized, an elastomer material is utilized to form the air chamber and be embedded with the bistable structure. In some examples, the elastomer material may include ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, or any suitable combination thereof. The elastomer material may include a thermoset. For example, the elastomer material may include polyisoprene, polybutadiene, chloroprene rubber, polychloroprene, neoprene, butyl rubber, a halogenated butyl rubber, styrene-butadiene rubber, nitrile rubber, or any suitable combination thereof. The elastomer material may include a thermoplastic elastomer. For example, elastomer material may include a styrenic block copolymer, thermoplastic polyolefinelastomers, thermoplastic vulcanizates, thermoplastic polyurethanes, thermoplastic copolyester, thermoplastic polyamides, or any suitable combination thereof. In various embodiments, the soft elastomer may be formed from any moldable material with a hardness of 00 to 90 Shore A on the Shore Hardness Scale. In some examples, the elastomer material may be the same material used to form soft folding hinge 120.

The elastomer is desirably configured with a high extension ratio. For example, the elastomer may be configured with an extension ratio of between about 1 and about 12, more preferably between about 3 and about 10. The elastomer may be able to endure high pressure without blasting at relatively thin thickness. In some examples, the elastomer material may have a thickness of about 1 mm, about 2 mm, about 3 mm, about 4 mm, about 5 mm, about 10 mm, about 20 mm, or greater. In various embodiments, the elastomer may be proportional in size to the actuator 101. For example, a small actuator may utilize an elastomer with a thickness of about 2 mm, while a larger actuator may utilize an elastomer with a thickness of about 10 mm. In the preferred embodiment, the maximum thickness is about 3 mm.

As shown in FIG. 1D, when stacking multiple pairs, instead of directly connecting two pairs with a cylindrical elastomer chamber, part of frustum shells 110 can be shaved off and replaced by elastomer. In this way, the ratio between actuator lengths in the stretched and compressed states increases, and the snapping behavior still exists due to the remaining shell 110. In addition, soft hinge 120 may be formed from the elastomer. In some examples, the amount shaved off frustum shells 110 is about 1 mm, about 2 mm, about 3 mm, about 5 mm, about 10 mm, about 20 mm, or greater. In various embodiments, the amount shaved off frustum shells 110 may not exceed about 50% of the height of frustum shall 115.

To maintain both the capability of elongation and retraction, a thin support shell 115 may be utilized for the elastomer wall of frustum shell 110 to prevent the elastomer material from deforming. Otherwise, actuator 101 may be unable to return to its original compressed position because the elastomer wall will be sucked inward and take up the space where frustum shell 111 folds into. Support shell 115 has about the same shape as frustum shell 110 and is held in place by the shape of the inner wall. Support shell is not embedded into the elastomer to avoid constraining the elastomer's elongation property. Support shell 115 may be formed from a polymeric material. Support shell 115 may be formed from a plastic. Support shell 115 may be formed from a rigid plastic. Support shell 155 may be formed from a flexible plastic. In some examples, support shell 115 may be formed from poly(ethylene terephthalate) (PET). In various embodiments, the support shell 115 may be formed from any hard material with a thickness of less than about lmm. Support shell 115 may have a thickness of between about 1 mm and about 10 mm. Support shell 115 may have a thickness of between about 2 mm and about 9 mm. Support shell 115 may have a thickness of between about 4 mm and about 7 mm. Support shell 115 may have a thickness of about 5 mm.

In various embodiments, silicone rubber may be chosen as the elastomer for the extensible air chamber. A polyethylene terephthalate (PET) sheet may be selected as the material for the thin frustum shells and support shells. In order to embed PET into the silicone rubber, yarn is wrapped around the shell to serve as a cover for the sharp edge and as a medium that can attached to the silicone strongly. Alternatively or additionally, natural or synthetic fibers may be wrapped around the shell. The fibers may be natural fibers. For example, the fibers may include cotton, silk, linen, bamboo, hemp, maize, nettle, soy, wool, alpaca, angora, mohair, llama, cashmere, camel hair, yak hair, possum hair, musk ox hair, other animal hair, or any suitable combination thereof. The fibers may be synthetic fibers. For example, the fibers may include nylon, acrylic fiber, rayon, polyester, or any suitable combination thereof. The fibers may be made of any material that is able to absorb the molding.

Figure 4:
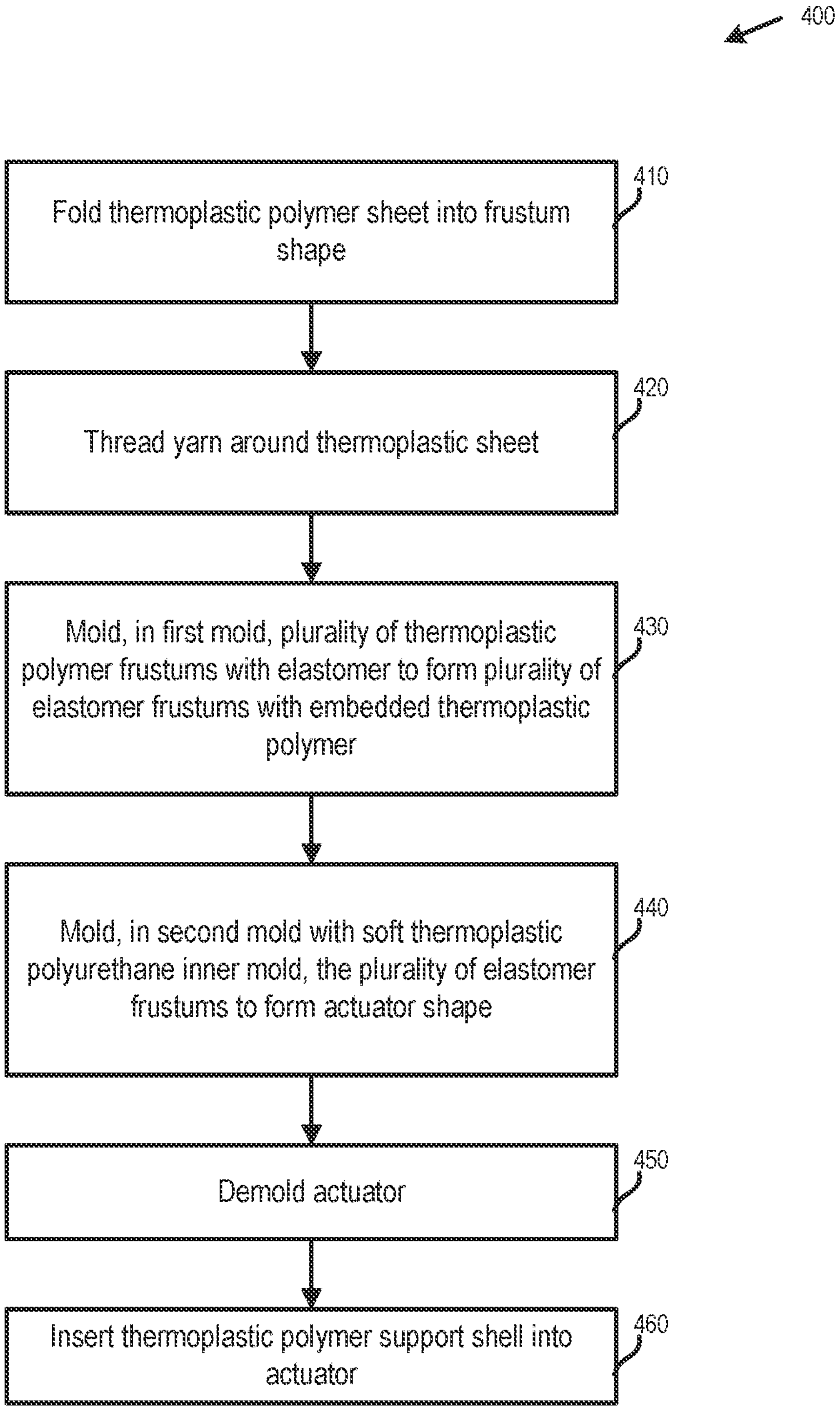
FIG. 4 is a flow chart of a method for forming an actuator, in accordance with various exemplary embodiments.
Figure 5:
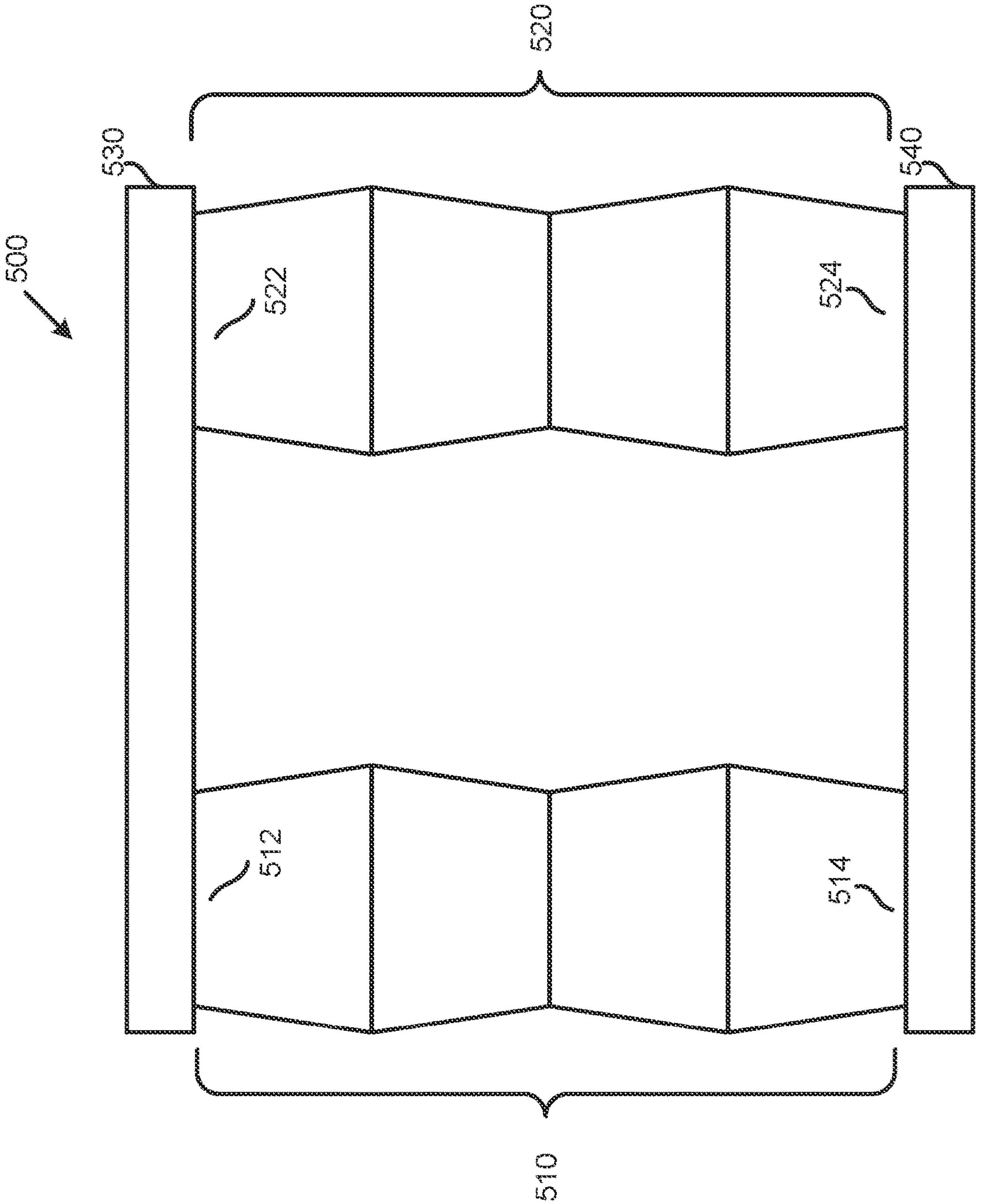
FIG. 5 illustrates an exemplary apparatus, in accordance with various exemplary embodiments.

With reference now to FIG. 4, a method 400 for forming an actuator may include folding a thermoplastic polymer sheet into a frustum shape (operation 410). Method 400 may further include threading yarn around the thermoplastic polymer sheet (operation 420). Method 400 may further include molding, in a first mold, a plurality of thermoplastic polymer frustums with an elastomer to form a plurality of elastomer frustums with an embedded thermoplastic polymer (operation 430). Method 400 may further include molding, in a second mold with a soft thermoplastic polyurethane inner mold, the plurality of elastomer-covered frustums to form an actuator shape (operation 440). Method 400 may further include demolding the actuator (operation 450). Method 400 may further include inserting a thermoplastic polymer support shell into the actuator (operation 460).

Figures 2A, 2B, 2C, 2D, 2E, 2F, 2G:
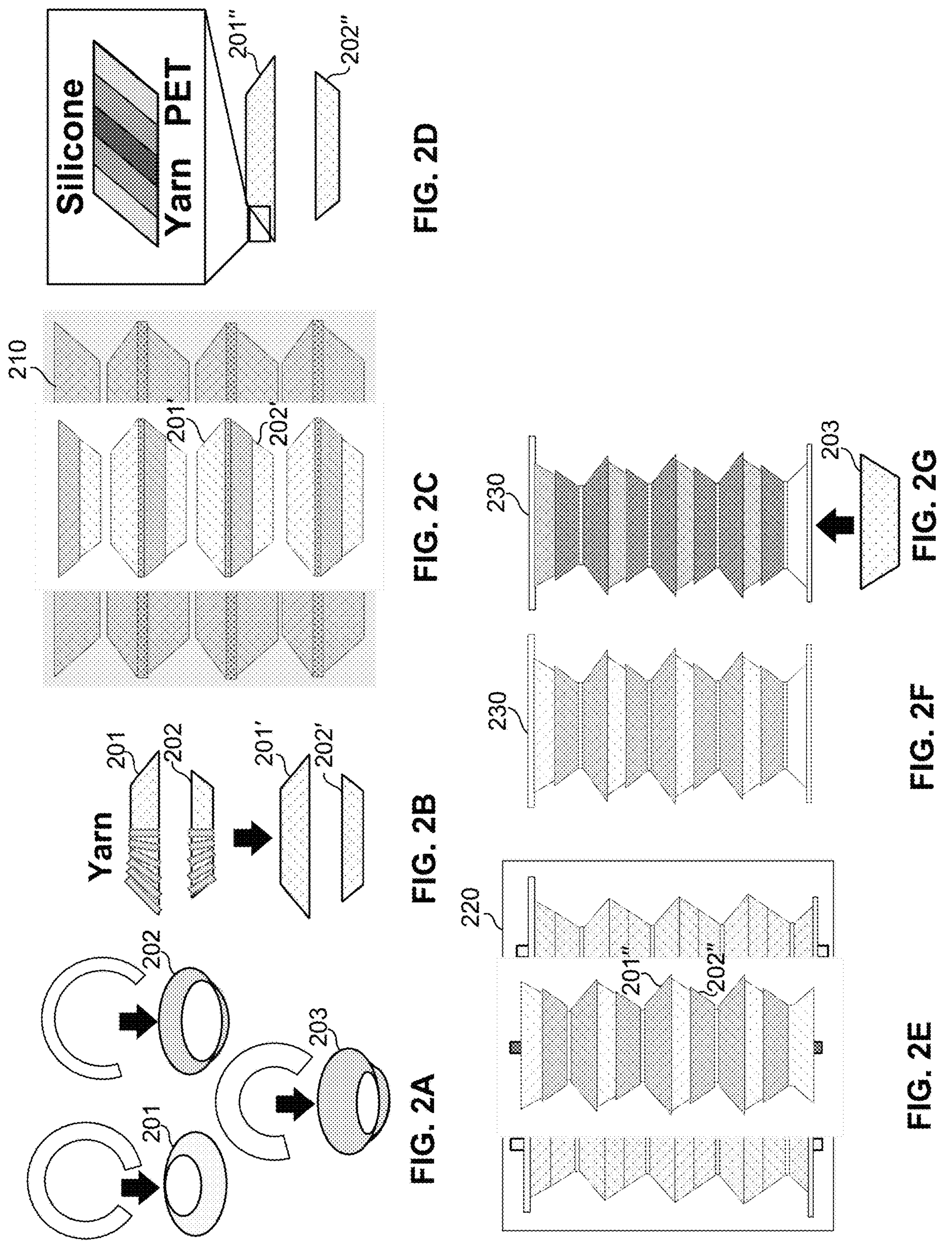
FIGS. 2A, 2B, 2C, 2D, 2E, 2F, and 2G illustrate an exemplary manufacturing process for an inflatable actuator, in accordance with various exemplary embodiments.

With reference again to FIGS. 2A-2G, an exemplary manufacturing process is illustrated. In various embodiments, there are three main steps: embedding frustum shells into silicone, stacking frustum shell pairs, and inserting support shells. As shown in FIG. 2A, a PET sheet is laser cut into three different shapes 201, 202, 203 and folded, and glued into the frustum shells with different base angles and the support shells, respectively. In some examples, the PET shapes 201, 202, 203 may have a thickness of between about 1 mm and about 10 mm. The PET shapes 201, 202, 203 may have a thickness of between about 2 mm and about 9 mm. The PET shapes 201, 202, 203 may have a thickness of between about 4 mm and about 7 mm. The PET shapes 201, 202, 203 may have a thickness of about 5 mm. In various embodiments, the thickness depends on and is proportional to the size of the actuator. In the preferred embodiment, the PET shapes 201, 202, 203 may have a thickness of less than 1 mm.

As shown in FIG. 2B, the frustum shells 201, 202 are then threaded with yarn to have a robust bond with silicone. The yarn may include natural fibers. For example, the yarn may include cotton, silk, linen, bamboo, hemp, maize, nettle, soy, wool, alpaca, angora, mohair, llama, cashmere, camel hair, yak hair, possum hair, musk ox hair, other animal hair, or any suitable combination thereof. The yarn may include synthetic fibers. For example, the fibers may include nylon, acrylic fiber, rayon, polyester, or any suitable combination thereof. In various embodiments, the fibers may be made of any material that is able to absorb the molding.

As shown in FIG. 2C, the threaded PET shells 201', 202' are then put into mold 210 where silicone is poured. In some examples, mold 210 may be 3D printed. In some examples, mold 210 may include any 3D-printable material. For example, mold 210 may include a plastic. The plastic may include a thermoplastic or a thermosetting plastic. The plastic may include acrylonitrile butadiene styrene (ABS), polylactic acid (PLA), polyethylene terephthalate glycol (PETG), nylon, thermoplastic polyurethane (TPU), polyvinyl alcohol (PVA), high impact polystyrene (HIPS), carbon fiber, Kevlar, or fiberglass. In some examples, mold 210 may include a resin. In some examples, mold 210 may include a nylon composite. For example, mold 210 may include nylon reinforced with glass, aluminum, or carbon fiber. In some examples, mold 210 may include a metal. For example, mold 210 may include titanium, stainless steel, aluminum, tool steel, or a nickel alloy.

As shown in FIG. 2D, once cured and released, a thin cover of silicone evenly and robustly covers the frustum shells 201", 202". In some examples, the thin cover of silicone may have a thickness of about 1 mm, about 2 mm, about 3 mm, about 4 mm, about 5 mm, about 10 mm, about 20 mm, or greater. The thickness of the thin cover of silicone may depend on and be proportional to the size of the actuator 230. In the preferred embodiment, the thickness of the thin cover of silicone may not exceed 3 mm.

As shown in FIG. 2E, the threaded and silicone-coated frustum shells 201", 202" are then connected together with silicone in another mold 220, resulting in actuator 230, as shown in FIG. 2F. Mold 220 may be 3D printed. In some examples, mold 220 may include any 3D-printable material. For example, mold 220 may include a plastic. The plastic may include a thermoplastic or a thermosetting plastic. The plastic may include acrylonitrile butadiene styrene (ABS), polylactic acid (PLA), polyethylene terephthalate glycol (PETG), nylon, thermoplastic polyurethane (TPU), polyvinyl alcohol (PVA), high impact polystyrene (HIPS), carbon fiber, Kevlar, or fiberglass. In some examples, mold 210 may include a resin. In some examples, mold 220 may include a nylon composite. For example, mold 220 may include nylon reinforced with glass, aluminum, or carbon fiber. In some examples, mold 220 may include a metal. For example, mold 220 may include titanium, stainless steel, aluminum, tool steel, or a nickel alloy.

Actuator 230 may contain 2 pairs of frustums, 3 pairs of frustums, 4 pairs of frustums, 5 pairs of frustums, or more.

As shown in FIG. 2G, support shell 203 is inserted into demolded actuator 230. Support shell 203 may have a thickness of between about 1 mm and about 10 mm. Support shell 203 may have a thickness of between about 2 mm and about 9 mm. Support shell 203 may have a thickness of between about 4 mm and about 7 mm. Support shell 203 may have a thickness of about 5 mm. In various embodiments, the support shell 203 may have a thickness that depends on and is proportional to the actuator size. In the preferred embodiment, the support shell thickness may be less than about 1 mm.

With returning reference to FIGS. 3A-3C, an exemplary apparatus is illustrated. FIG. 3A illustrates a "power push" of stress ball 330 to the front of apparatus 300. Apparatus 300 starts with actuators 310, 320 in a compressed state, for example as described with reference to FIG. 1A. Apparatus then performs the "power push" by extending actuators 310, 310' into the stretched state, as described with reference to FIG. 1C.

Figure 3C:
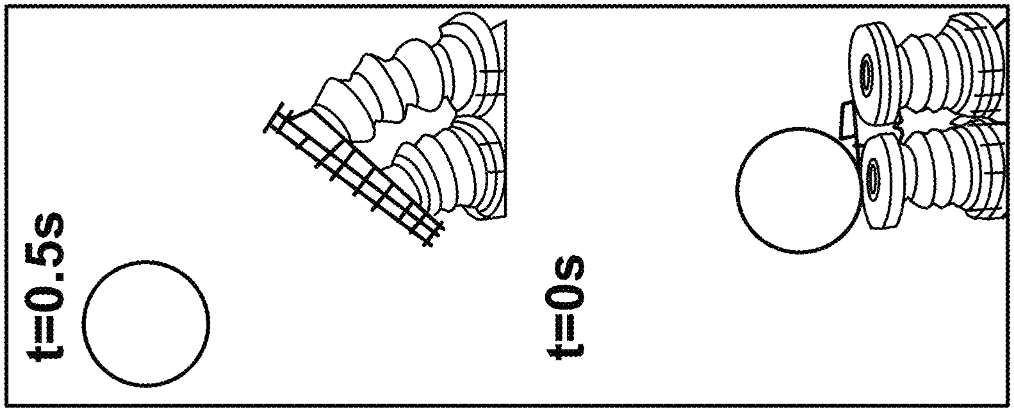
FIGS. 3A, 3B, and 3C illustrate operation of an exemplary actuator apparatus, in accordance with various exemplary embodiments.
Figure 3B:
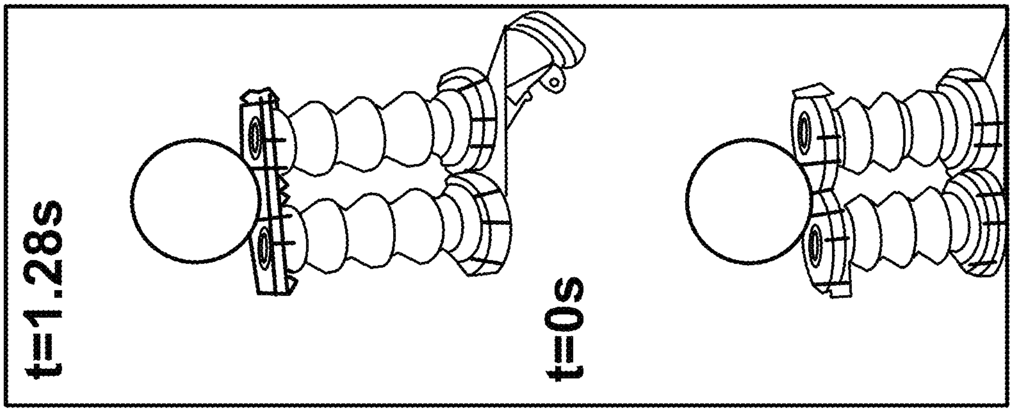
Figure 3A:
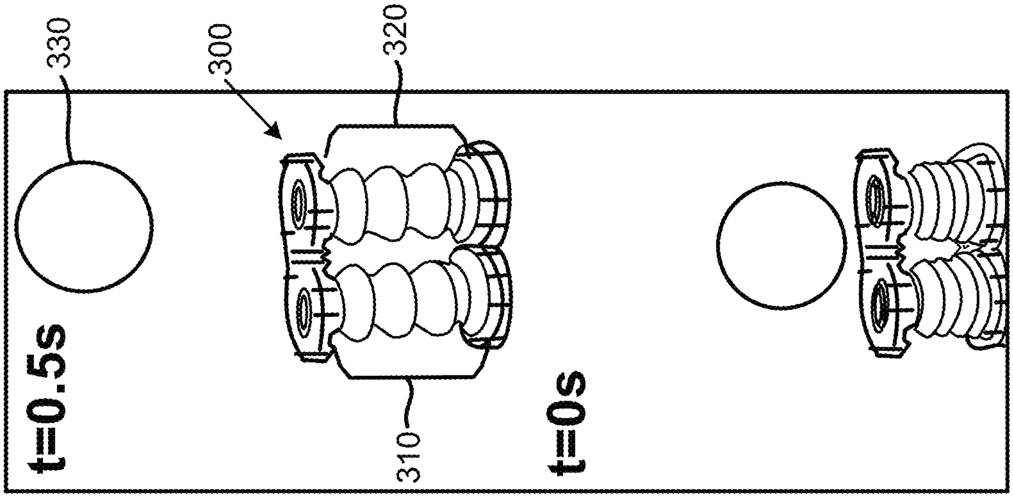

With continued reference to FIGS. 3A-3C, FIG. 3B illustrates a "gentle push" of stress ball 330 to the front of apparatus 300. Apparatus 300 starts with actuators 310, 320 in a natural state, as described with reference to FIG. 1B. Apparatus 300 performs the "gentle push" by extending actuators 310, 320 into the stretched state, as described with reference to FIG. 1C.

With continued reference to FIGS. 3A-3C, FIG. 3C illustrates a "power push" of stress ball 330 to the side of apparatus 300. Apparatus 300 starts with actuators 310, 320 in a compressed state, as described with reference to FIG. 1A. Apparatus then performs the "power push" by extending actuator 310 into the stretch state, as described with reference to FIG. 1C, without actively extending actuator 320.

Figure 6:
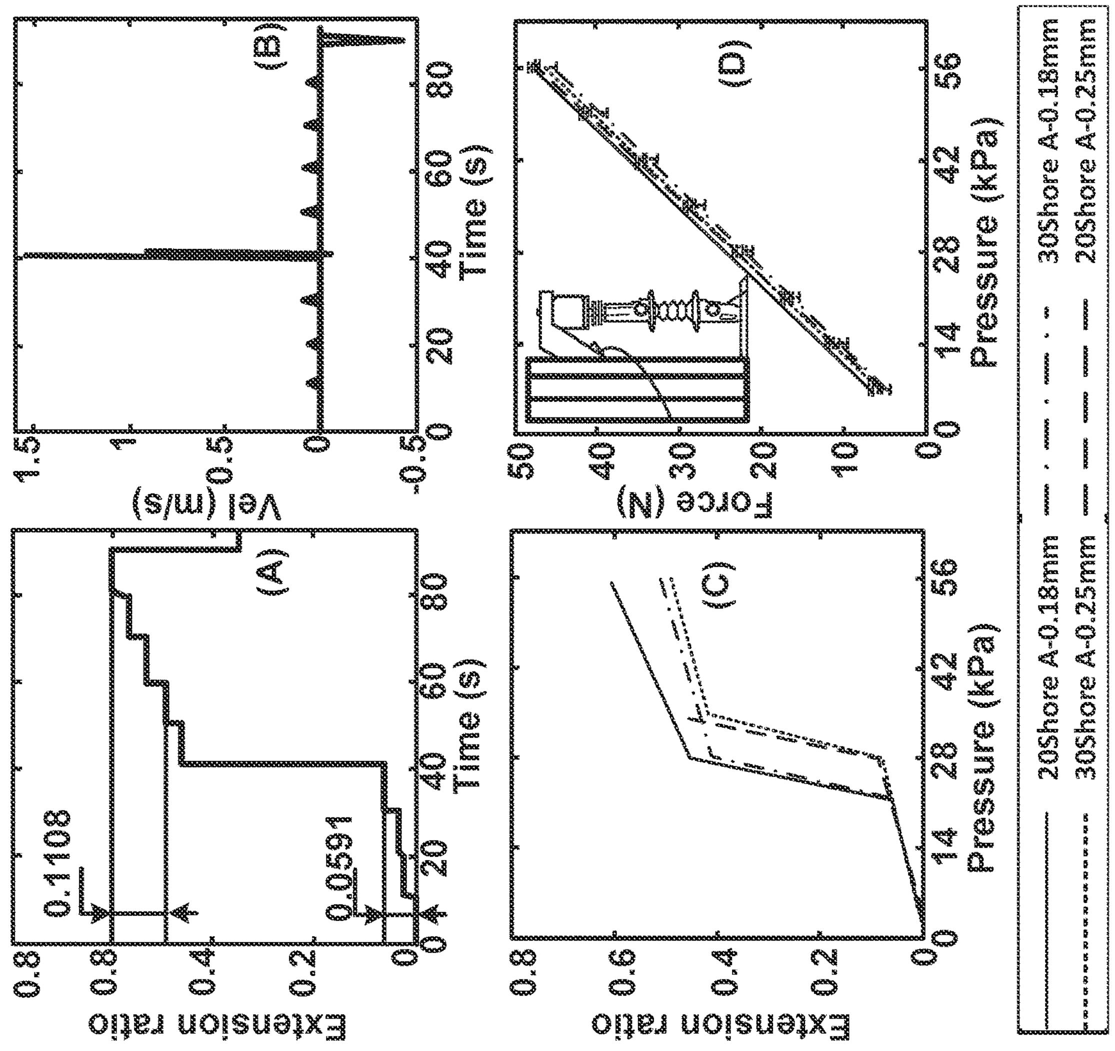
FIG. 6 illustrates plots describing various properties of an apparatus manufactured in accordance with examples herein.

With reference now to FIG. 6, FIG. 6 illustrates plots describing various properties of an apparatus manufactured in accordance with examples herein. Here, a motion test was conducted with each parameter set utilizing a motion capture system with six cameras. The actuator was mounted on a rigid plate while the input air pressure was changed from 0 kPa to 55.16 kPa in 6.89 kPa increments. Markers were placed on the bottom and top plates of the actuator. The marker positions were recorded at 120 Hz through the motion capture system. For each actuator, the motion test was repeated three times.

With reference now to FIG. 6A, FIG. 6A describes the extension ratio of an apparatus including a Shore 20A-0.18 mm actuator as a function of time. It will be noted that a snapping motion is observed at around 40 seconds when the desired pressure of 27.58 kPa is greater than the triggering pressure of the actuator. Additionally, the actuator dynamics change with the occurrence of the snapping motion, the exact pressure increments resulting in different extension ratio increases (e.g., 0.0591 when increasing from 0 kPa to 20.68 kPa, compared to 0.1108 when increasing from 34.47 kPa to 55.16 kPa).

FIG. 6B describes the velocity of a surface of an apparatus including a 20Shore A-0.18 mm actuator as a function of time. It will be noted that both extension and retraction occur in less than about 1 second. The maximum speed of the snapping motion is 1.5 m/s.

FIG. 6C describes the extension ratio of various apparatuses as a function of pressure. In particular, FIG. 6C plots the extension ratio as a function of pressure of four different apparatuses, varying from each other in both thickness of the frustums and in silicone hardness. It will be noted that the apparatuses with thicker frustums have a higher triggering pressure. It will also be noted that the apparatuses with lower silicone hardness extend to a larger extension ratio than the apparatuses with higher silicone hardness.

FIG. 6D describes the force exerted by various apparatuses as a function of pressure. In particular, FIG. 6D plots the force exerted as a function of pressure of four different apparatuses, varying from each other in both thickness of the frustums and in silicone hardness. It will be noted that all apparatuses have a linear relationship between pressure and force exerted, regardless of frustum thickness and silicone hardness.

Figure 7:
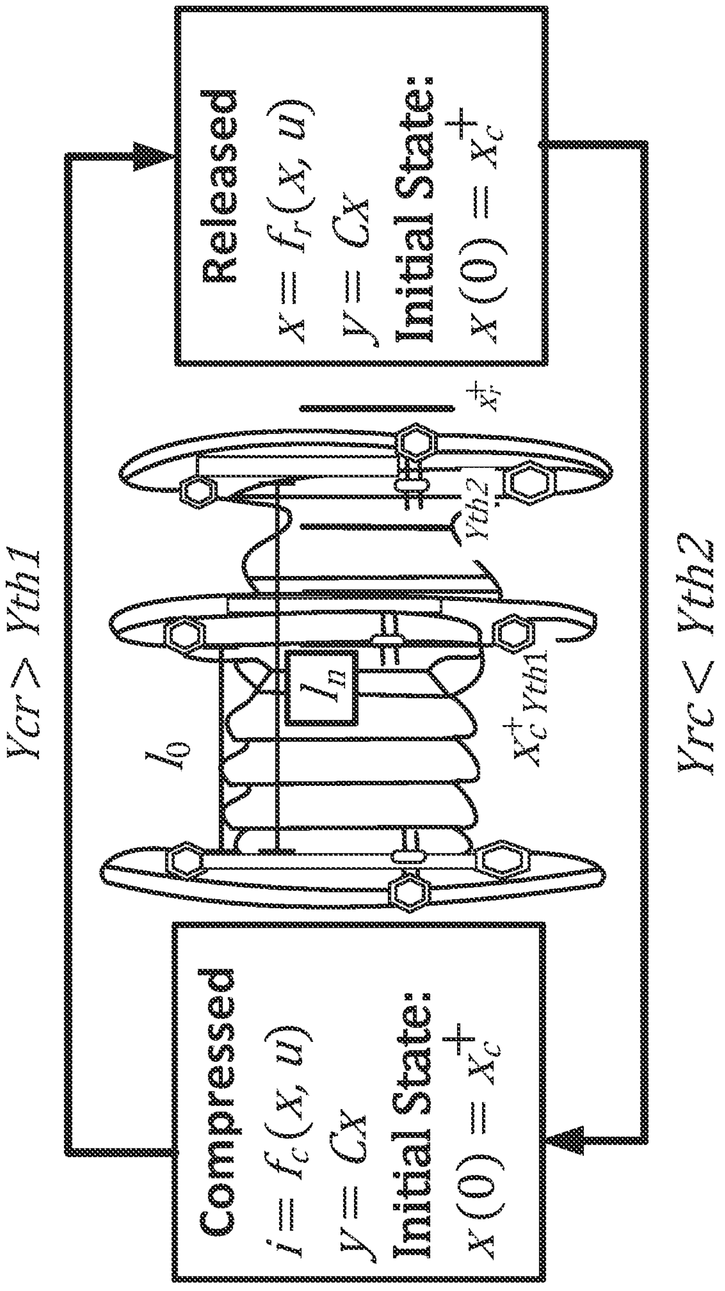
FIG. 7 illustrates a hybrid linear parameter-varying (HPLV) model for an apparatus manufactured in accordance with examples herein.

With reference now to FIG. 7, FIG. 7 illustrates a hybrid linear parameter-varying (HPLV) model for an apparatus manufactured in accordance with examples herein. In particular, compressed and stretched modes are defined to model the continuous elongation dynamics before and after the natural state. The HLPV model can accurately describe the changes in the actuator length and the air pressure within the chamber.

The model contains variables defined by the equations below.

$$f_c(x,u)=\begin{bmatrix} x_2 \\ -\frac{k_c(u)}{m}x_1-\frac{b_c(u)}{m}x_2+\frac{\gamma}{m}x_3 \\ \alpha_c(u)x_3+\beta_c(u)u \end{bmatrix}$$

$$f_r(x,u)=\begin{bmatrix} x_2 \\ -\frac{k_r(u)}{m}(x_1-h_n)-\frac{b_r(u)}{m}x_2+\frac{\gamma}{m}x_3 \\ \alpha_r(u)x_3+\beta_r(u)u \end{bmatrix}$$

$$C=\begin{bmatrix} 1 & 0 & 0 \\ 0 & 0 & 1 \end{bmatrix}$$

$$x=[h,\dot{h},p_m]^T,\ h_n=l_n-l_0$$

where m, u, $l_n$, and $p_m$ are the mass, input pressure set-point, natural state length, and the air pressure inside the chamber of the actuator, respectively. k(u), b(u), a(u), and f3(*u*) are input-dependent parameters. $\gamma$=5.577 is the coefficient that maps the chamber's air pressure to the output force, identified through the aforementioned payload test, described with reference to FIG. 7. Snapping condition pa and initial state $x_r^+$ were evaluated experimentally. Because the frustums do not necessarily achieve the snapping motion simultaneously, another snapping condition $y_{th2}$ was calculated as the absolute value of the difference between the length of the actuator at the natural state and the height of one smaller-angled frustum. Initial state $x_c^+$ is selected as the compressed state with minimum length, zero velocity, and atmospheric pressure.

Figure 8:
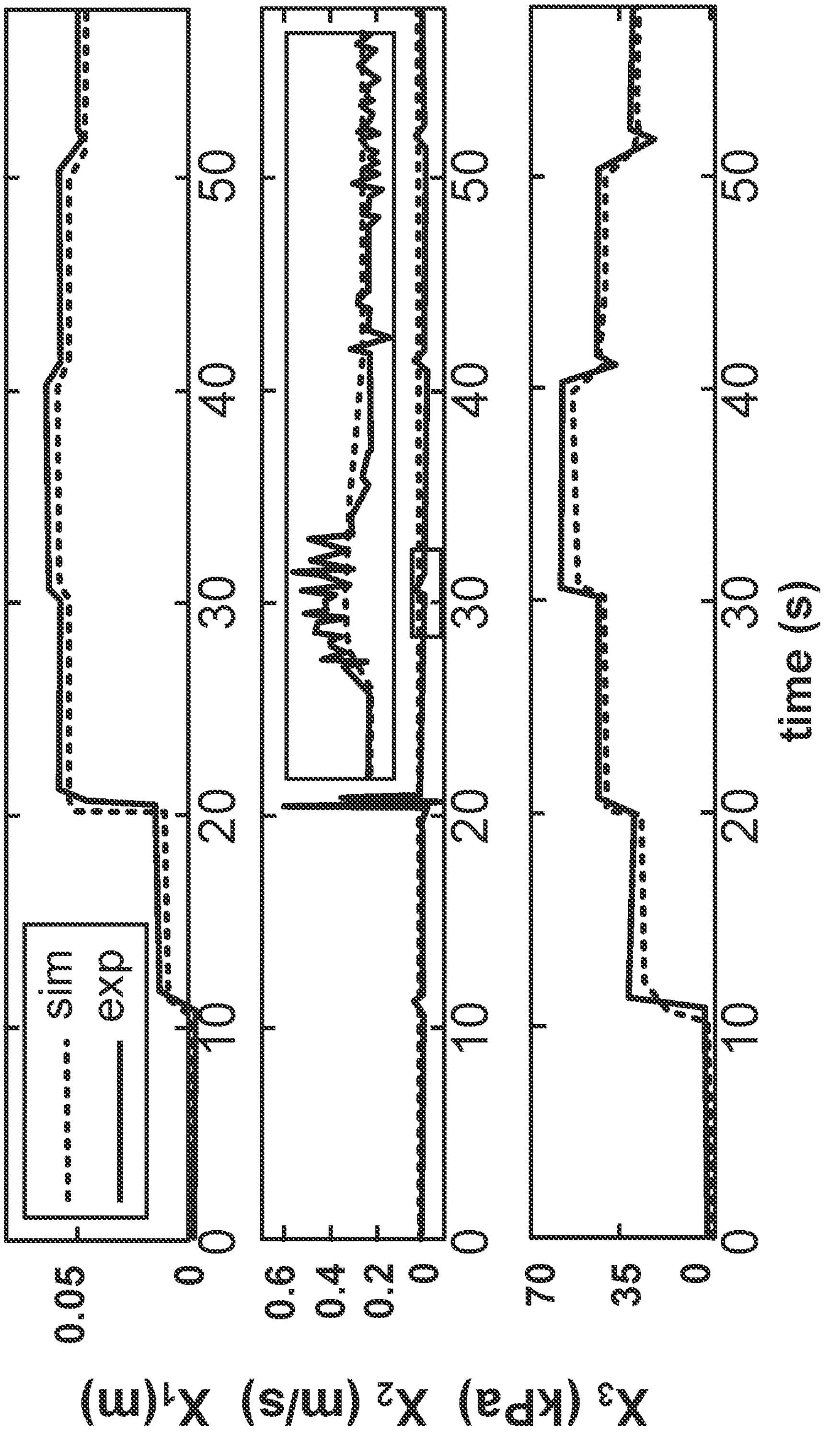
FIG. 8 illustrates the position, velocity, and pressure of an apparatus manufactured in accordance with examples herein.

With reference now to FIG. 8, FIG. 8 illustrates the position, velocity, and pressure of an apparatus manufactured in accordance with examples herein. FIG. 8 illustrates both experimental data (exp) and data simulated using the HPLV model described with reference to FIG. 7. In will be noted that the model accurately predicts the behavior of the apparatus.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An actuator, comprising:

a body comprising a plurality of pairs of frustums, wherein the body is configured to receive a fluid to extend the actuator and to remove the fluid to contract the actuator, wherein each pair of frustums comprises two thin frustum shells sharing a common base circle diameter, and wherein one of the thin frustum shells is configured with a first base angle and the other of the thin frustum shells is configured with a second base angle that is smaller than the first base angle.

2. The actuator of claim 1, wherein the first base angle is about 55 degrees.

3. The actuator of claim 2, wherein the second base angle is about 40 degrees.

4. The actuator of claim 2, wherein the two thin frustum shells are coupled by a soft folding hinge.

5. The actuator of claim 4, wherein the soft folding hinge comprises an elastomer.

6. The actuator of claim 2, wherein a portion of the thin frustum shell configured with the large base angle is shaved off and replaced by an elastomer.

7. The actuator of claim 1, wherein the body further comprises an elastomer.

8. The actuator of claim 7, wherein the elastomer comprises silicone.

9. The actuator of claim 1, wherein each frustum is threaded with yarn.

10. The actuator of claim 1, wherein the plurality of pairs of frustums comprises a thermoplastic polymer.

11. The actuator of claim 10, wherein the thermoplastic polymer comprises polyethylene terephthalate (PET).

12. A method for forming an actuator, the method comprising:

folding a thermoplastic polymer sheet into a frustum shape;

threading yarn around the thermoplastic polymer sheet;

molding, in a first mold, a plurality of thermoplastic polymer frustums with an elastomer to form a plurality of elastomer frustums with embedded thermoplastic polymer;

molding, in a second mold with a soft thermoplastic polyurethane inner mold, the plurality of elastomer frustums to form an actuator shape;

demolding the actuator; and inserting a thermoplastic polymer support shell into the actuator.

13. The method of claim 12, wherein the thermoplastic polymer comprises polyethylene terephthalate (PET).

14. The method of claim 12, wherein the plurality of thermoplastic polymer frustums comprises at least one thermoplastic polymer frustum with a large base angle and at least one thermoplastic polymer frustum with a small base angle.

15. The method of claim 12, wherein the elastomer comprises silicone.

* * * * *